United States Patent
Igarashi et al.

(10) Patent No.: US 10,252,379 B2
(45) Date of Patent: Apr. 9, 2019

(54) BRAZING MATERIAL FOR BONDING; AND COMPOSITE PART AND CUTTING TOOL USING SAME

(71) Applicant: MITSUBISHI MATERIALS CORPORATION, Tokyo (JP)

(72) Inventors: Makoto Igarashi, Naka (JP); Tadakazu Ohashi, Naka (JP); Kenji Yumoto, Anpachi-gun (JP); Hiroyasu Shimizu, Anpachi-gun (JP)

(73) Assignee: MITSUBISHI MATERIALS CORPORATION, Tokyo (JP)

( * ) Notice: Subject to any disclaimer, the term of this patent is extended or adjusted under 35 U.S.C. 154(b) by 249 days.

(21) Appl. No.: 15/107,632

(22) PCT Filed: Dec. 22, 2014

(86) PCT No.: PCT/JP2014/083872
§ 371 (c)(1),
(2) Date: Jun. 23, 2016

(87) PCT Pub. No.: WO2015/098819
PCT Pub. Date: Jul. 2, 2015

(65) Prior Publication Data
US 2016/0318132 A1 Nov. 3, 2016

(30) Foreign Application Priority Data

Dec. 25, 2013 (JP) .................................. 2013-266912
Dec. 18, 2014 (JP) .................................. 2014-256468

(51) Int. Cl.
*B23K 35/32* (2006.01)
*B23K 35/40* (2006.01)
(Continued)

(52) U.S. Cl.
CPC ............ *B23K 35/325* (2013.01); *B22F 7/064* (2013.01); *B23B 27/18* (2013.01); *B23K 35/005* (2013.01);
(Continued)

(58) Field of Classification Search
USPC ............ 51/307, 309; 407/117, 119; 118/121; 403/272; 428/457, 697, 698, 699
See application file for complete search history.

(56) References Cited

U.S. PATENT DOCUMENTS 6,155,755 A * 12/2000 Kanada ................... B23B 27/18
428/698
7,776,454 B2 * 8/2010 Chang ...................... B21B 3/00
228/117
(Continued)

FOREIGN PATENT DOCUMENTS

CN 101381207 A 3/2009
CN 101549444 A 10/2009
(Continued)

OTHER PUBLICATIONS

Extended European Search Report dated May 4, 2017 for the corresponding European Patent Application No. 14874964.1.
International Search Report dated Mar. 24, 2015 for the corresponding PCT Application No. PCT/JP2014/083872.
Office Action dated Aug. 24, 2017 for the corresponding Chinese Patent Application No. 201480070133.4.

*Primary Examiner* — Archene A Turner
(74) *Attorney, Agent, or Firm* — Leason Ellis LLP

(57) ABSTRACT

A cutting tool including a cutting edge part made of cBN sintered material bonded through a brazing material for bonding and a cutting tool body made of WC-based cemented carbide is provided. In the cutting tool, the cutting edge part made of cBN sintered material and the cutting tool body made of WC-based cemented carbide are brazed by using a blazing material for bonding including: 35-40% of Ti in a mass ratio; 35-40% of Zr in a mass ratio; 5-15% of Ni
(Continued)

in a mass ratio; and the Cu balance including inevitable impurities.

3 Claims, 1 Drawing Sheet

(51) Int. Cl.
  *B23B 27/18* (2006.01)
  *C22C 29/08* (2006.01)
  *C22C 30/02* (2006.01)
  *B23K 35/00* (2006.01)
  *C22C 14/00* (2006.01)
  *B22F 7/06* (2006.01)
  *C22C 1/04* (2006.01)
  *B23K 101/20* (2006.01)

(52) U.S. Cl.
  CPC ............ *B23K 35/32* (2013.01); *B23K 35/327* (2013.01); *B23K 35/40* (2013.01); *C22C 1/0458* (2013.01); *C22C 14/00* (2013.01); *C22C 29/08* (2013.01); *C22C 30/02* (2013.01); *B23B 2222/28* (2013.01); *B23B 2226/125* (2013.01); *B23B 2240/08* (2013.01); *B23K 2101/20* (2018.08); *C22C 2204/00* (2013.01)

(56) References Cited

U.S. PATENT DOCUMENTS

| 2005/0161494 | A1 | 7/2005 | Matsu | |
| 2006/0131359 | A1 | 6/2006 | Pohlman | |
| 2012/0034474 | A1* | 2/2012 | Ozaki | ............... B23B 27/18 |
| | | | | 428/457 |
| 2013/0236240 | A1 | 9/2013 | Ishida et al. | |

FOREIGN PATENT DOCUMENTS

| CN | 102355969 A | 2/2012 |
| CN | 102794680 A | 11/2012 |
| CN | 103459071 A | 12/2013 |
| EP | 0940215 A | 9/1999 |
| JP | 06-071649 B | 9/1994 |
| JP | 09-314358 A | 12/1997 |
| JP | 10-084140 A | 3/1998 |
| JP | 10-193206 A | 7/1998 |
| JP | 11-320218 A | 11/1999 |
| JP | 2003-314985 A | 11/2003 |
| JP | 2012-111187 A | 6/2012 |
| WO | WO-2005/063436 A | 7/2005 |
| WO | WO-2012/070563 A | 5/2012 |
| WO | WO-2012/144502 A | 10/2012 |

* cited by examiner

BRAZING MATERIAL FOR BONDING; AND COMPOSITE PART AND CUTTING TOOL USING SAME

CROSS-REFERENCE TO RELATED PATENT APPLICATIONS

This application is a U.S. National Phase Application under 35 U.S.C. § 371 of International Patent Application No. PCT/JP2014/083872, filed Dec. 22, 2014, and claims the benefit of Japanese Patent Application No. 2013-266912, filed Dec. 25, 2013 and Japanese Patent Application No. 2014-256468, filed Dec. 18, 2014, all of which are incorporated herein by reference in their entireties. The International Application was published in Japanese on Jul. 2, 2015 as International Publication No. WO/2015/098819 under PCT Article 21(2).

FIELD OF THE INVENTION

The present invention relates to a brazing material for bonding; and a composite part and a cutting tool using the same. More specifically, a brazing material for bonding with improved bonding strength suitable for bonding a cubic boron nitride (hereinafter referred as "cBN") sintered material and a cemented carbide; and a composite part and a cutting tool using the brazing material for bonding.

Priority is claimed on Japanese Patent Application No. 2013-266912 filed on Dec. 25, 2013 and Japanese Patent Application No. 2014-256468 file on Dec. 18, 2014, the contents of which are incorporated herein by reference.

BACKGROUND OF THE INVENTION

Recently, cutting tools, such as inserts and end mills, using cBN sintered materials in the cutting edge parts are provided as working tools for molds used for manufacturing bodies of cellular phones, smart phones, or the like. The cBN sintered material has hardness second only to diamond; and exhibits high productivity and enhanced service life.

However, the cBN sintered material itself is hard to be machined and expensive. In addition, the shape of the sintered material is limited to a discotic shape, and it is impossible to form a tool shape freely. Therefore, the use application of the cBN sintered material is limited.

On the one hand, with increased usage of difficult-to-cut materials, the use application of the cBN sintered material is increasing recently in spite of the difficulty of machining the tools. As a method to overcome the cost and workability problems, there is a method in which the inexpensive and highly workable cutting tool main body made of WC-based cemented carbide; and the cutting edge part made of a material of cBN sintered material are brazed. By using this method, cutting tools, in which the cutting tool main bodies made of WC-based cemented carbide and the cutting edge parts made of a material of the cBN sintered material are bonded, are provided.

For example, a cutting tool, in which a cBN sintered material is bonded on the cutting tool body made of WC-based cemented carbide through a bonding part, is disclosed in Patent Literature 1 (PTL 1). The bonding part is made of one or two of: 15-65 weight % of Ti and Zr; and Cu. And because of this, the cBN sintered material is bonded to the cutting tool body strongly and highly-stiffly without cracking or the like.

In addition, a cutting tool, in which a cutting edge piece made of a cBN-based sintered material is bonded directly on a cutting edge piece brazing part of a cutting tool main body made of WC-based cemented carbide by using a Ag alloy brazing material, is disclosed in Patent Literature 2 (PTL 2). The Ag alloy brazing material has a composition made of: 20-35 weight % of Cu; 1-5 weight % of Ti; 1-20 weight % of In; and the Ag balance including inevitable impurities. The cutting edge piece disclosed in PTL 2 has an excellent brazing bonding strength.

In addition, a joined body is disclosed in Patent Literature 3 (PTL 3). In the jointed body disclosed in PTL 3, a cBN-based sintered material is bonded on the cutting tool body made of WC-based cemented carbide through a bonding part; and a titanium nitride compound layer with a layer thickness of 10-300 nm is formed on the interface between the cBN-based sintered material and the bonding material. In addition, the thickness of the bonding part on the back surface of the cBN-based sintered material is thinner than that of the bonding part on the bottom surface in the jointed body disclosed in PTL 3. Because of these, the jointed body disclosed in PTL 3 has an excellent brazing bonding strength.

CITATION LIST

Patent Literature

PTL 1: Japanese Unexamined Patent Application, First Publication No. H11-320218 (A)
PTL 2: Japanese Unexamined Patent Application, First Publication No. H10-193206 (A)
PTL 3: Japanese Unexamined Patent Application, First Publication No. 2012-111187 (A)

SUMMARY OF INVENTION

Technical Problem

PTL 1 disclosed that strong bonding strength can be obtained in the cutting tool by using Ti-based metal. However, there is a problem that in the case where Ti spreads extensively, the mechanical characteristics of: the carbide shank; and the cemented carbide-made cutting tool body on the cutting edge side are reduced, which causes breakage of the cutting tool.

In the Ag-based brazing material disclosed in PTL 2, sufficient bonding strength cannot be obtained since the mechanical strength of Ag is low.

The joined body disclosed in PTL 3 having the titanium nitride compound layer with the layer thickness of 10-300 nm, has a problem that sufficient bonding strength cannot be obtained because of inappropriate reaction between the bonding material and the cBN-based sintered material.

In addition, the conventional brazing materials have a problem that in the case where the cutting tool is used for heavy cutting, the cBN sintered material falls off from the bonding part; and the cutting tool reaches the end of the service life of the cutting tool, due to insufficient adhesion strength between the cBN sintered material and the cutting tool body made of cemented carbide.

The purpose of the present invention, which is to solve the technical problems, is to provide a cutting tool capable of retaining the excellent cutting performance even in the case where the cutting tool is used in the heavy cutting condition by increasing adhesion strength between the cBN sintered material and the cemented carbide.

Solution to Problem

The inventors of the present invention conducted intensive studies on how to improve adhesion strength of the bonding part in a cutting tool made of an ultra-high pressure sintered material having a cutting edge part made of a cBN sintered material (hereinafter, referred as a sintered material) bonded through the brazing material for bonding and a cutting body made of WC-based cemented carbide, and obtained following findings.

First, they found that the brazing bonding strength therebetween is improved by forming an interface layer containing a predetermined amount of Ti and N on the interface on the sintered material side of the bonding part bonding the sintered material and the cemented carbide by the brazing material.

Second, they found that addition of Zr in the brazing material promotes formation of the needle crystal structure growing from the cBN grains; the needle crystal structure exhibits a significant anchoring effect; and adhesive strength between the sintered material and the cemented carbide is improved.

Third, they found that an alloy of a novel composition is excellent at the bonding strength as the brazing material made of Ti—Zr—Ni—Cu component by repeating numerous experiments based on hypothesis and test about the containing component of the brazing material. Particularly, they found the novel action in which the interface layer having a constant thickness is formed without forming the granular structure or the columnar structure in the bonding part, while the needle crystal structure is formed, by adding Zr and Ni in the brazing material alloy. In addition, they found that the above-mentioned novel action contributes the improvement of the adhesiveness of the bonding part.

Fourth, they completed the present invention by performing in detail analysis about: the composition of the brazing material; the structure of the bonding part in the case where the sintered material and the cemented carbide is bonded by using the brazing material; and the cutting performance of the cutting tool with this bonding part.

The present invention is made based on the above-described findings and has aspects indicated below.

(1) A blazing material for bonding including: 35-40% of Ti in a mass ratio; 35-40% of Zr in a mass ratio; 5-15% of Ni in a mass ratio; and the Cu balance including inevitable impurities.

(2) A composite part including: a cemented carbide body; and a cubic boron nitride sintered material bonded to the cemented carbide body through a bonding part, wherein (a) the bonding part includes an interface layer having an average layer thickness of 0.5 µm to 5 µm, which is adjacent to the cubic boron nitride sintered material and contains 50 atomic % or more of Ti and 10 atomic % or more of N, (b) the bonding part has needle crystal structure, which: contacts a cubic boron nitride grain constituting the cubic boron nitride sintered material; contains 50 atomic % or more of Ti, 10-30 atomic % of Zr, and 2-10 atomic % of B; and has 10-100 nm of an average width and 5 or more of an average aspect ratio, and (c) the needle crystal structure has a length equals to or longer than a layer thickness of the interface layer, which is adjacent to the cubic boron nitride sintered material and contains at least Ti and N, and traverses the interface layer in a thickness direction.

(3) A cutting tool with a cubic boron nitride sintered material including the composite part according to the above-described (2), wherein the bonding part interposes between the cubic boron nitride material and a cutting tool body made of cemented carbide.

Advantageous Effects of Invention

According to aspects of the present invention, a composite part with excellent adhesion strength between the sintered material and the cutting tool body made of cemented carbide can be obtained by bonding the sintered material and the cutting tool body made of cemented carbide with the brazing material for bonding including: 35-40% of Ti in a mass ratio; 35-40% of Zr in a mass ratio; 5-15% of Ni in a mass ratio; and the Cu balance including inevitable impurities. As a result, falling off of the sintered material is unlikely to occur even in the case where it is used for heavy cutting in the cutting tool using the composite part; and the cutting tool retains an excellent cutting performance for a long time.

BRIEF DESCRIPTION OF THE DRAWINGS

FIG. 2 shows the cBN sintered material; the interface layer; cBN crystal grains; the needle crystal structure; and the bonding part.

DETAILED DESCRIPTION OF THE INVENTION

The present invention is explained in detail below in reference to drawings.

In the present invention, the cutting tool, which is an aspect of the present invention, is configured by bonding the cutting edge part made of the cBN sintered material 1 and the cutting tool body made of WC-based cemented carbide (cemented carbide including WC) through the interposing brazing material.

Figure 1:
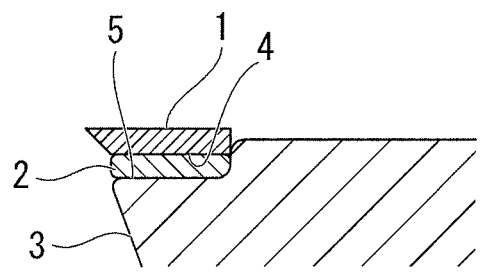
FIG. 1 is a vertical sectional view of the cutting tool, which is an embodiment of the present invention; and shows the positional relationship of the cBN sintered material; the bonding part; and the cutting tool body in this embodiment.

FIG. 1 is a vertical sectional view of the cutting tool, which is an embodiment of the present invention; and shows the positional relationship of the cBN sintered material 1; the bonding part 2; and the cutting tool body 3 in this embodiment. The cBN sintered material 1 is bonded to the cutting tool body 3 through the bonding part 2. This bonding part 2 interposes between the bonding surface 4 of the cBN sintered material and the bonding surface 5 of the cutting tool body. The bonding surface 4 of the cBN sintered material is the surface formed on the bottom surface of the cBN sintered material 1. The bonding surface 5 of the cutting tool body is the surface formed on the upper surface of the cutting tool body 3.

The composition of the boding part 5 depends heavily on the composition of the brazing material, which is the precursor of the bonding part 5. In addition, the bonding condition; the composition of the cubic boron nitride sintered material 1; and the composition of the cemented carbide body 3 influence on the composition of the bonding part 5.

The brazing material for bonding, which is the first aspect of the present invention, includes: 35-40% of Ti in a mass ratio; 35-40% of Zr in a mass ratio; 5-15% of Ni in a mass ratio; and the Cu balance including inevitable impurities.

Adding the Ti component to the brazing material for bonding has effects of: forming the interface layer 8 including Ti and N on the interface to the cubic boron nitride sintered material 1; consequently improving the brazing bonding strength; and improving high-temperature strength properties after brazing. However, if the content amount of the Ti component were less than 35% in a mass ratio, the layer thickness of the above-described compound layer would be less than 0.5 µm; and the layer would not exhibit sufficient inter-laminar strength. On the other hand, if it exceeded 40%, the melting temperature of the brazing material would increase; and the brazing bonding strength would be reduced due to formation of distortion or the like during brazing and bonding. Therefore, the content amount of Ti component is set to the range of 35-40%.

Preferably, the content amount of the Ti component is 36-39% in a mass ratio in the brazing material of the present invention. More preferably, it is 37-38% in a mass ratio.

Adding the Zr component to the brazing material for bonding has effects of: improving the brazing bonding strength between the cubic boron nitride sintered material 1 and the cemented carbide; and improving the high-temperature strength properties after brazing. The addition of Ti component to the brazing material is conventionally known in brazing and bonding the cubic boron nitride sintered body 1 and the cemented carbide. However, by adding Zr, which has further extremely high chemical reactivity compared to Ti, the cubic boron nitride and Zr react each other; and the needle crystal structure containing Zr, Ti, and N is formed in such a way that the needle crystal structure looks like growing from the interface of the cubic boron nitride grains in the present invention. As a result, the needle crystal structure exhibits a great anchoring effect; and strong brazing strength is obtained. However, if the content amount of Zr were less than 35% in a mass ratio, a sufficiently long needle crystal structure would not be formed; a crystal length longer than the thickness of the interface layer 8 adjacent to the cubic boron nitride sintered material 1 would not be obtained; and the layer would not exhibit sufficient inter-laminar strength. On the other hand, if the content amount of Zr exceeded 40% in a mass ratio, the melting temperature of the brazing material would increase; and the brazing bonding strength would be reduced due to formation of distortion or the like during brazing and bonding. Therefore, the content amount of Zr component is set to the range of 35-40%.

Preferably, the content amount of the Zr component is 36-39% in a mass ratio in the brazing material of the present invention. More preferably, it is 37-38% in a mass ratio.

Adding the Ni component to the brazing material for bonding has effects of significantly improving the wettability of the cemented carbide and the cubic boron nitride sintered material 1 during brazing. Because of this, the brazing strength to the cemented carbide is ensured; and the brazing bonding strength is significantly improved during brazing the cubic boron nitride sintered material 1. Accordingly, the special technical effect of the present invention, which is obtaining the high-temperature strength properties after brazing, is obtained. More specifically, the brazing material thoroughly wets the surface of the cubic boron nitride sintered material 1 evenly during brazing and bonding by adding Ni in the brazing material. Consequently, the compound layer including Ti and N, which is the layer adjacent to the cubic boron nitride sintered material 1, becomes a laminar structure without forming the granular structure, the columnar structure, or the like.

However, if the content amount of the Ni component is less than 5% in a mass ratio, it would be harder to obtain the above-described effect. On the other hand, if it exceeded 15% in a mass ratio, the melting temperature of the brazing material would increase; and the brazing bonding strength would be reduced due to formation of distortion or the like during brazing and bonding. Therefore, the content amount of Ni component is set to the range of 5-15%.

Preferably, the content amount of the Ni component is 7-13% in a mass ratio in the brazing material of the present invention. More preferably, it is 9-11% in a mass ratio.

Figure 2:
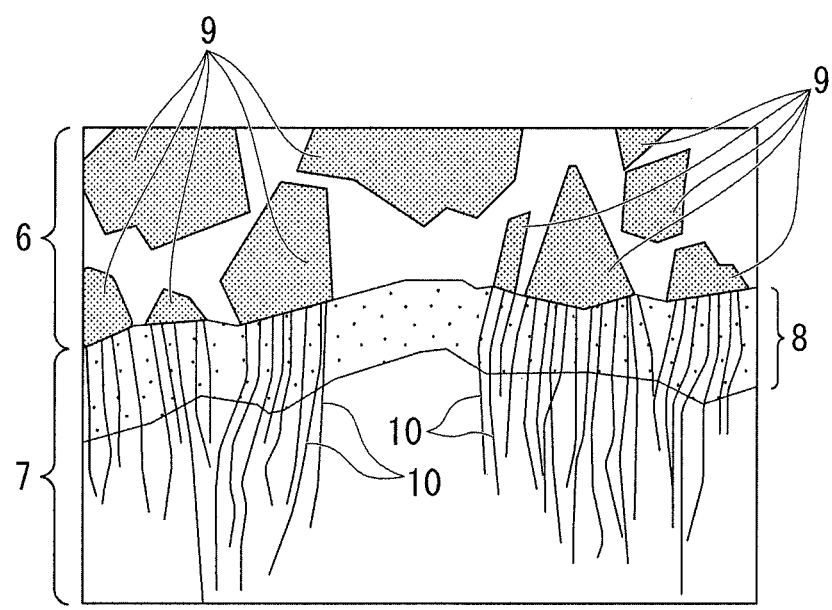
FIG. 2 is an enlarged cross-sectional schematic view of the bonding part on the cBN sintered material side in an embodiment of the present invention.

FIG. 2 is an enlarged cross-sectional schematic view of the bonding part on the cBN sintered material side in an embodiment of the present invention. FIG. 2 shows the cBN sintered material 6; the interface layer 8; cBN crystal grains 9; the needle crystal structure 10; and the bonding part 7. The part corresponding to the cutting tool body is not shown in FIG. 2, since the part of the bonding part on the cutting tool body side is not included in FIG. 2.

The interface layer 8 is the layer that exists on the interface on the cubic boron nitride sintered material side of the bonding part 7. The interface layer 8 is the dotted area in FIG. 2.

The interface layer 8 is the layer that exists on the interface on the cubic boron nitride sintered material side of the bonding part 7 having the average thickness of 0.5-5 µm. This interface layer 8 contains 50 atomic % or more of Ti, and 10 atomic % or more of N. The boundary between the interface layer 8 and the cubic boron nitride sintered material 6 is defined by the bonding surface 4 of the cubic boron nitride sintered material.

Speaking of Ti and N in the interface layer 8 of the bonding part 2, the interface layer 8 is formed by Ti in the brazing material reacting with N in the cubic boron nitride sintered material. If the content amount of the Ti component were than 50 atomic %, or the content amount of the N component were less than 10 atomic %, the reaction between the brazing material and the cubic boron nitride sintered material 6 would not be sufficient. In this case, voids are likely to occur; and the bonding part does not exhibit sufficient adhesiveness. Because of the reason described above, it is necessary to set the content amounts of Ti and N in the interface layer 8 to 50 atomic % or more and 10 atomic % or more, respectively.

In addition, if the average layer thickness of the interface layer 8 were less than 0.5 µm, the reaction between the brazing material and the cubic boron nitride sintered material 6 would not be sufficient; and voids would be likely to occur. If it exceeded 5 µm, brittle intermetallic compounds would be produced in the interface layer 8 due to excessive proceeding of the reaction between the brazing material and the cubic boron nitride sintered material 6; and consequently detachment of the intermetallic compounds is likely to occur. Because of the reason described above, it is necessary to set the average layer thickness of the interface layer 8 to 0.5-5 µm.

Existence of the interface layer 8 can be confirmed by texture observation and the composition analysis of the vertical cross section of the bonding part by an electron scanning microscope-energy dispersive X-ray spectrometry (SEM-EDS).

By SEM observation of the cross-section, the location of the interface layer 8 can be roughly recognized based on the contrast difference. In the secondary electron image in SEM, the portion corresponding to the interface layer has a darker contrast compared to other part of the bonding part.

In order to define the interface layer more precisely, elemental mapping on the cross-section is performed by SEM-EDS. The elemental mapping is performed in the condition of: 8 µm×11 µm of the field view; 10,000 of magnification ratio; and 0.01 µm or less of the spatial resolution. The composition analysis is performed on the region on the cubic boron nitride sintered material side of the bonding part 7 by SEM-EDS; and the region including: 50 atomic % or more of Ti; and 10 atomic % or more of N, is defined as the interface layer 8.

The component composition of the interface layer 8 is obtained by: performing 10-point analysis with a 0.5 μm interval on a straight line in a continuous interface layer; and calculating the average value of the 10 points.

The average layer thickness of the interface layer 8 is obtained by: performing measurements of the layer thickness of the interface layer in a continuous interface layer 8 at 10 points; and calculating the average value of the 10 points.

For the measurement of the average layer thickness of the interface layer 8, the results of the texture observation and the results of the composition analysis of the vertical cross-section of the bonding part, which are acquired for confirmation of the interface layer 8, are used.

In the measurement of the thickness of the interface layer 8, a straight line orthogonal to the bonding surface 4 of the cubic boron nitride sintered material is drawn. Then, the length from the bonding surface 4 of the cubic boron nitride sintered material to the bonding surface 5 on the cemented carbide body side along the straight line among the interface layer is obtained.

The measurement of thickness of the interface layer 8 at 10 points is performed by: measuring layer thickness at 10 points with a 0.5 μm interval on a straight line in a continuous interface layer 8; and calculating the average value of the 10 points.

The crystal structure 10 in the needle shape form contacting the cubic boron nitride grain 9 (hereinafter referred as "needle structure" or "needle crystal structure") is explained below.

The needle crystal structure 10 is a crystal structure in a needle shape contacting the cubic boron nitride grain 9; and traverses the interface layer 8 vertically from the cubic boron nitride sintered material side to the cemented carbide body side.

The composition of the needle structure contains: 50 atomic % or more of Ti; 10-30 atomic % of Zr; and 2-10 atomic % of B. The average width of the needle structure is 10-100 nm, and the average aspect ratio is 5 or more.

For the measurement of the composition, width, and aspect ratio of the needle structure, the results of the texture observation and the results of the composition analysis of the vertical cross-section of the bonding part, which are acquired for confirmation of the interface layer, are used.

Based on the results of the elemental mapping on a portion corresponding to the confirmed needle structure, the composition of the needle structure can be obtained.

In terms of the needle structure, in regard to each of 10 crystal grains existing in the observation field of 8 μm×11 μm, the greatest dimension is defined as the major axis; the widest width perpendicular to the major axis of the crystal is defined as the minor axis; and the aspect ratio is obtained by diving the major axis by the minor axis. The average length (the average value of the major axis), the average width (the average value of the minor axis), and the average aspect ratio are obtained by calculating the average values of the 10 crystal grains, respectively.

The needle structure 10 is the structure formed by Ti and Zr in the brazing material reacting with the cubic boron nitride grains. If the content amount of Ti were less than 50 atomic %; the content amount of Zr were less than 10 atomic %; or the content amount of B were less than 2 atomic %, in the needle crystal structure 10, the needle structure with the intended aspect ratio would not be formed. As a result, the bonding part cannot exhibit a sufficient anchoring effect, which would be a cause of peeling. On the other hand, is the content amount of Zr exceeded 30 atomic %; or the content amount of B exceeded 10 atomic %, in the needle crystal structure 10, the average width of the needle structure would exceed 100 nm. As a result, the mismatch between the needle structures and the cubic boron nitride grains cannot be absorbed sufficiently; and cracks between the needle structure and the cubic boron nitride grain are likely to be developed.

Because of the reason described above, it is necessary that the composition of the needle structure contains: 50 atomic % or more of Ti; 10-30 atomic % of Zr; and 2-10 atomic % of B.

In addition, if the average width of the needle structure 10 were less than 10 nm; or the average aspect ratio of the needle structure 10 were less than 5, forming crystal grains having a length equals to or longer than the interface layer 8 would become difficult; and consequently it would be difficult for the bonding part exhibit a sufficient anchoring effect. In addition, if the average width of the needle structure 10 exceeded 100 nm, strength between the needle structure 10 and the cubic boron nitride gain 9 would be reduced. Because of the reason described above, it is necessary that the average width; and the average aspect ratio of the needle structure 10 are 10-100 nm; and 5 or more, respectively.

Not only the bonding strength between the cubic boron nitride sintered material 6 and the interface layer 8, but the bonding strength between the bonding part 7 adjacent to the interface layer 8 and the interface layer 8 can be significantly increased, since the crystal structure 10 in the needle shape has the length equals to or longer than the interface layer 8, which is adjacent to the cubic boron nitride sintered material 6 and contains at least Ti and N; and the needle structure 10 traverses the interface layer 8 vertically. Thus, it is necessary that the crystal structure 10 with the needle shape traverses the interface layer 8 vertically.

Next, the present invention is specifically explained based on Examples. Example explained below is a specific embodiment, and the aspect of the present invention is not particularly limited by the explanation.

Examples

As raw material powders, the WC powder; the VC powder; the TaC powder; the NbC powder; the $Cr_3C_2$ powder; and the Co powder, each of which had the average grain size of 0.5-1 μm, were prepared. Then, these powders were blended to obtain the blending compositions shown in Table 1; and wet-mixed for 24 hours using a ball mill. After drying, the mixtures were subjected to press molding under the pressure of 100 MPa to obtain green compacts. The obtained green compacts were sintered in the condition of: under 6 Pa vacuum; at 1400° C. of temperature; and for 1 hour of the retention time. By following the processes, the 4 kinds of the cutting tool bodies made of WC-based cemented carbide (hereinafter referred as the cemented carbide cutting tool body) A-1 to A-4 shown in Table 1 were formed.

TABLE 1

| | | Blending composition (mass %) | | | | | |
|---|---|---|---|---|---|---|---|
| Type | | Co | TaC | NbC | VC | $Cr_3C_2$ | WC |
| Cutting tool body made of WC-based cemented carbide | A-1 | 12 | — | — | 0.3 | 0.7 | balance |
| | A-2 | 10 | — | — | 1 | 0.5 | balance |
| | A-3 | 12 | — | — | — | 0.7 | balance |
| | A-4 | 8 | 2 | 1 | — | — | balance |

Next, as raw material powders of cBN sintered materials, the cBN powder; the TiN powder; the TiCN powder; the $TiB_2$ powder; the TiC powder; the AN powder; and the $Al_2O_3$ powder, each of which had the average grain size in the range of 0.5-4 μm, were prepared. Then, the powders were blended to obtain the blending compositions; and wet-mixed with acetone for 24 hours by a boll mill. After drying, the mixtures were subjected to press molding under the pressure of 100 MPa to obtain green compacts having a dimension of the diameter 15 mm×thickness 1 mm. Next, these green compacts were sintered in the condition of: under the vacuum atmosphere of $1 \times 10^{-2}$ Pa; at 1000° C. of temperature; and for 30 minutes of the retention time to remove volatile components and adsorbed components on surfaces of the powder. By following the above-described processes, the sintered material precursors for the cutting edge pieces were formed. Then, the sintered material precursors for the cutting edge pieces were stacked with separately prepared support pieces made of WC-based cemented carbide having: the composition of 16 mass % of Co and the WC balance; and the dimension of the diameter 15 mm×thickness 2 mm. The sintered material precursors were inserted in the conventional ultra-high pressure sintering apparatus in the state where they were stacked with the support pieces. Then, ultra-high pressure and temperature sintering was performed in the condition of: under the vacuum atmosphere of 5 GPa; at 1500° C. of temperature; for 30 minutes of the retention time. By following the above described processes, the cBN sintered materials B-1 to B-6 were produced. The compositions of the cBN sintered materials B-1 to B-6 were obtained as the volume % from the cBN's area % obtained in the image analysis of the SEM observation results of the polished surface of the cross-section of the sintered materials. In terms of the composition other than cBN, only the components constituting the main bonded phase and other bonded phases were confirmed. The results of the analysis are shown in Table 2.

TABLE 2

| | | Composition of the sintered material | | |
|---|---|---|---|---|
| Type | | cBN (volume %) | Main bonded phase | Other bonded phase |
| cBN sintered material | B-1 | 65 | TiN | $Al_2O_3$, $TiB_2$, AlN, inevitable impurities |
| | B-2 | 75 | TiCN | $Al_2O_3$, $TiB_2$, AlN, inevitable impurities |
| | B-3 | 70 | TiN | $Al_2O_3$, $TiB_2$, AlN, inevitable impurities |
| | B-4 | 76 | TiN | $Al_2O_3$, $TiB_2$, AlN, inevitable impurities |
| | B-5 | 63 | TiCN | $Al_2O_3$, $TiB_2$, AlN, inevitable impurities |

TABLE 2-continued

| | Composition of the sintered material | | |
|---|---|---|---|
| Type | cBN (volume %) | Main bonded phase | Other bonded phase |
| B-6 | 72 | TiC | $Al_2O_3$, $TiB_2$, AlN, inevitable impurities |

Next, raw material powders of the brazing material were weighted in order to obtain the blending compositions shown in Table 3; and the mixtures were melted by a vacuum arc melting furnace to obtain ingots in a button shape. After turning them into a plate shape by hot rolling, cold rolling was performed to obtain the brazing materials for bonding C-1 to C-10 in a thin plate shape with the thickness of 50 μm.

TABLE 3

| | | Composition of the alloy (mass %) | | | |
|---|---|---|---|---|---|
| Type | | Ti | Zr | Ni | Cu |
| Brazing material for bonding | C-1 | 37.5 | 37.5 | 10.0 | balance |
| | C-2 | 40.0 | 40.0 | 15.0 | balance |
| | C-3 | 35.0 | 35.0 | 5.0 | balance |
| | C-4 | 37.0 | 37.0 | 7.0 | balance |
| | C-5 | 36.0 | 39.0 | 12.0 | balance |
| | C-6 | 39.0 | 36.0 | 10.0 | balance |
| | C-7 | 45.0 | 45.0 | 5.0 | balance |
| | C-8 | 30.0 | 30.0 | 20.0 | balance |
| | C-9 | 40.0 | 40.0 | 3.0 | balance |
| | C-10 | 45.0 | 30.0 | 10.0 | balance |

Then, by the brazing materials in the conditions as shown in Table 4, the cBN sintered materials and the cemented carbide body were bonded by using each of the brazing material alloys.

The insert shape of the cBN sintered materials relative to the cemented carbide body was "CNMG120408." The bonding part of the cemented carbide body had the bottom surface area of 2.96 $mm^2$; the side surface area of 4.89 $mm^2$; and the total area was 7.85 $mm^2$. The brazing treatment was performed in a continuous furnace under an Ar gas atmosphere in Example 1, and in a vacuum furnace in Examples 2-5 and Comparative Examples 1-3.

As explained above, the hard sintered material tools of Examples 1-10 and Comparative Examples 1-12 were produced. In each of Examples and Comparative Examples, the hard sintered material made of cBN was brazed on the cutting tool body made of the WC-based cemented carbide by using the brazing material having one of component compositions.

TABLE 4

| Type | | Type of the cutting tool body made of WC-based cemented carbide | Type of cBN sintered material | Type of brazing material for bonding | Bonding brazing condition | | | | |
|---|---|---|---|---|---|---|---|---|---|
| | | | | | Bonding temperature (° C.) | Bonding atmosphere | Retention time at the bonding temperature (seconds) | Rate of temperature increase (° C./min) | Rate of temperature decrease (° C./min) |
| Hard sintered material cutting tool as | 1 | A-1 | B-1 | C-1 | 950 | Ar gas atmosphere | 600 | 8 | 2 |
| | 2 | A-1 | B-2 | C-2 | 950 | Vacuum (less than $1 \times 10^{-5}$ Torr) | 150 | 80 | 120 |

TABLE 4-continued

| Type | | Type of the cutting tool body made of WC-based cemented carbide | Type of cBN sintered material | Type of brazing material for bonding | Bonding brazing condition | | | | |
|------|---|---|---|---|---|---|---|---|---|
| | | | | | Bonding temperature (° C.) | Bonding atmosphere | Retention time at the bonding temperature (seconds) | Rate of temperature increase (° C./min) | Rate of temperature decrease (° C./min) |
| Example of the present invention | 3 | A-1 | B-3 | C-3 | 900 | Vacuum (less than $1 \times 10^{-5}$ Torr) | 150 | 80 | 120 |
| | 4 | A-2 | B-4 | C-4 | 850 | Vacuum (less than $1 \times 10^{-5}$ Torr) | 150 | 80 | 120 |
| | 5 | A-2 | B-5 | C-5 | 1000 | Vacuum (less than $1 \times 10^{-5}$ Torr) | 150 | 80 | 120 |
| | 6 | A-2 | B-6 | C-6 | 900 | Vacuum (less than $1 \times 10^{-5}$ Torr) | 150 | 80 | 120 |
| | 7 | A-3 | B-1 | C-1 | 950 | Vacuum (less than $1 \times 10^{-5}$ Torr) | 150 | 80 | 120 |
| | 8 | A-3 | B-2 | C-2 | 900 | Vacuum (less than $1 \times 10^{-5}$ Torr) | 150 | 80 | 120 |
| | 9 | A-4 | B-3 | C-3 | 950 | Vacuum (less than $1 \times 10^{-5}$ Torr) | 150 | 80 | 120 |
| | 10 | A-4 | B-4 | C-4 | 950 | Vacuum (less than $1 \times 10^{-5}$ Torr) | 150 | 80 | 120 |
| Hard sintered material cutting tool as Comparative Example | 1 | A-1 | B-1 | C-7 | 950 | Vacuum (less than $1 \times 10^{-5}$ Torr) | 150 | 80 | 120 |
| | 2 | A-1 | B-2 | C-8 | 1200 | Vacuum (less than $1 \times 10^{-5}$ Torr) | 150 | 80 | 120 |
| | 3 | A-1 | B-3 | C-9 | 950 | Vacuum (less than $1 \times 10^{-5}$ Torr) | 150 | 80 | 120 |
| | 4 | A-2 | B-4 | C-10 | 900 | Vacuum (less than $1 \times 10^{-5}$ Torr) | 150 | 80 | 120 |
| | 5 | A-2 | B-5 | C-7 | 750 | Vacuum (less than $1 \times 10^{-5}$ Torr) | 150 | 80 | 120 |
| | 6 | A-2 | B-6 | C-8 | 900 | Vacuum (less than $1 \times 10^{-5}$ Torr) | 150 | 80 | 120 |
| | 7 | A-3 | B-1 | C-9 | 950 | Vacuum (less than $1 \times 10^{-5}$ Torr) | 150 | 80 | 120 |
| | 8 | A-3 | B-2 | C-10 | 1200 | Vacuum (less than $1 \times 10^{-5}$ Torr) | 150 | 80 | 120 |
| | 9 | A-3 | B-3 | C-7 | 950 | Vacuum (less than $1 \times 10^{-5}$ Torr) | 150 | 80 | 120 |
| | 10 | A-4 | B-4 | C-8 | 900 | Vacuum (less than $1 \times 10^{-5}$ Torr) | 150 | 80 | 120 |
| | 11 | A-4 | B-5 | C-9 | 750 | Vacuum (less than $1 \times 10^{-5}$ Torr) | 150 | 80 | 120 |
| | 12 | A-4 | B-6 | C-10 | 900 | Vacuum (less than $1 \times 10^{-5}$ Torr) | 150 | 80 | 120 |

[Preparation of Test Pieces for Shear Strength Measurement]

The test pieces for the shear strength measurement were prepared as in the method described below.

First, as hard sintered pieces, samples having a dimension of 1.5 mm (W)×1.5 mm (L)×0.75 mm (H) were prepared by using the cBN materials corresponding to the hard sintered material cutting tools of Examples 1-10 of the present invention, and those of Comparative Examples 1-12. In addition, as cemented carbide pieces, samples having a dimension of 1.5 mm (W)×4.5 mm (L)×1.5 mm (H) were prepared by using the WC-based cemented carbide materials corresponding to the hard sintered material cutting tools of Examples 1-10 of the present invention, and those of Comparative Examples 1-12 similarly. In addition, as supporting pieces, samples having a dimension of 1.5 mm (W)×1.5 mm (L)×0.75 mm (H) were prepared by using the WC-based cemented carbide materials corresponding to the hard sintered material cutting tools of Examples 1-10 of the present invention, and those of Comparative Examples 1-12 similarly.

Then, after combining the hard sintered piece and the supporting piece by the ultra-high pressure sintering process, the hard sintered piece and the supporting piece were brazed and joined to the one end surface of the cemented carbide piece through the bonding part (the brazing material). At this time, as the brazing material for the bonding part, the brazing materials corresponding to the hard sintered material cutting tools of Examples 1-10 of the present invention, and those of Comparative Examples 1-12 were used, and brazing and bonding were performed in the same conditions. Then, the test pieces of Examples of the present invention and Comparative Examples for shear strength measurement were prepared.

On each of the hard sintered material cutting tools of Examples 1-10 of the present invention and Comparative Examples 1-12, the texture observation and the composition analysis of the vertical cross section of the bonding part were performed by the electron scanning microscope-energy dispersive X-ray spectrometry (SEM-EDS). The component composition of the interface layer was obtained by: performing elemental mapping on the vertical cross-sections of the sintered material, bonding part, and the cemented carbide in the field view of 10,000 of magnification ratio with 0.01 μm or less of the spatial resolution to confirm that the layer adjacent to the sintered material was the interface layer containing Ti and N; performing the 10-points analysis; and calculating the average value of the 10 points. In addition, the component composition of the crystal structure in the needle shape was obtained by: confirming that the needle structure growing directly from the cubic boron nitride grains contained Zr, Ti, and N; performing the 10-points analysis on the component composition of the crystal grains constituting the needle structure; and calculating the average value of the 10 points. The average layer thickness of the interface layer was obtained by: drawing the straight line from the interface on the cubic boron nitride sintered material and the interface layer in the direction perpendicular to the interface; obtaining the length from the interface on the cubic boron nitride sintered material to the interface between the interface layer and the bonding part; and calculating the average value from the 10-points analysis. The average length, the average width, and the average aspect ratio of the needle structure were obtained by: in regard to each of 10 crystal grains constituting the needle structure in the observation field, defining the greatest dimension as the major axis; defining the widest width perpendicular to the major axis as the minor axis; obtaining the aspect ratio by dividing the major axis by the minor axis; and calculating the average value of the aspect ratios of the 10 crystal grains.

Results of the above-explained data collections are shown in Tables 5 and 6.

Next, the high speed wet continuous cutting tests on the carbolized steel were performed by using the hard sintered material cutting tools of Examples 1-10 of the present invention and Comparative Examples 1-12 in the state where each type of the hard sintered material cutting tools was screwed on the apical portion of the insert holder of tool steel with the fixing jig under the condition shown below; and falling off of the cutting edge part and the location of the breaking portion were observed.

Work: Round bar, JIS-SCM415 (hardness: 58 HRc)
Cutting speed: 150 m/min
Cutting depth: 1.0 mm
Feed: 0.3 mm/rev.
Cutting time: 40 minutes
(Standard cutting speed: 100 m/min., Standard cutting depth: 0.4 mm)

[High Temperature Shear Strength Test]

The high temperature shear strength was measured by using the test pieces for the shear strength measurement prepared by using the materials corresponding to the hard sintered material cutting tools of Examples 1-10 of the present invention and Comparative Examples 1-12 in the condition described below.

The load in which the hard sintered piece and the supporting piece were broken off from the cemented carbide piece was measured by fixing the test piece by gripping the upper and lower surfaces by a clamp; using the pressing piece in the rectangular column shape with a side of 1.5 mm made of cemented carbide; and placing load in the middle of the upper surface of the hard sintered material piece of the test piece under the atmosphere at 500° C.

For the pressing piece, one made of the WC-based cemented carbide corresponding to the cemented carbide piece of the test piece was used.

TABLE 5

| Type | | Type of cutting tool body made of WC-based cemented carbide | Type of cBN sintered | Type of brazing material for bonding | Bonding part | | | | | | | | | |
|---|---|---|---|---|---|---|---|---|---|---|---|---|---|---|
| | | | | | Component composition of the interface layer (at %)* | | | | | | | Component composition of the crystal structure in the needle shape (at %)* | | |
| | | | | | Ave. layer thickness (μm) | Ti | Zr | N | B | Ni | Cu | Ti | Zr | N |
| Hard sintered material cutting tool of Example of the present invention | 1 | A-1 | B-1 | C-1 | 1.0 | 65 | 4 | 30 | — | — | — | 70 | 20 | 5 |
| | 2 | A-1 | B-2 | C-2 | 5.0 | 68 | — | 32 | — | — | — | 50 | 15 | 12 |
| | 3 | A-1 | B-3 | C-3 | 0.5 | 75 | 9 | 16 | — | — | — | 61 | 10 | 25 |
| | 4 | A-2 | B-4 | C-4 | 2.2 | 50 | 10 | 40 | — | — | — | 66 | 12 | — |
| | 5 | A-2 | B-5 | C-5 | 0.8 | 80 | — | 10 | — | — | — | 77 | 20 | — |
| | 6 | A-2 | B-6 | C-6 | 4.1 | 60 | 3 | 37 | — | — | — | 55 | 30 | 3 |
| | 7 | A-3 | B-1 | C-1 | 0.9 | 77 | — | 23 | — | — | — | 60 | 18 | 17 |
| | 8 | A-3 | B-2 | C-2 | 4.5 | 70 | 2 | 28 | — | — | — | 54 | 23 | 13 |
| | 9 | A-4 | B-3 | C-3 | 0.7 | 56 | 5 | 39 | — | — | — | 77 | 21 | — |
| | 10 | A-4 | B-4 | C-4 | 1.3 | 66 | — | 34 | — | — | — | 64 | 24 | 5 |

TABLE 5-continued

| | | Type | | Bonding part Component composition of the crystal structure in the needle shape (at %)* | | | | | | Presence or absence of falling off of the cutting edge | High-temperature |
|---|---|---|---|---|---|---|---|---|---|---|---|
| | | | | B | Ni | Cu | Ave. width (nm) | Ave. length (nm) | Ave. aspect ratio | part (broken part or the like) | shearing strength (kgf/mm²) |
| | | Hard sintered material cutting tool of Example of the present invention | 1 | 5 | — | — | 20 | 2000 | 100 | absent (cemented carbide) | 30 |
| | | | 2 | 6 | — | 17 | 50 | 6500 | 130 | absent (cemented carbide) | 27 |
| | | | 3 | 4 | — | — | 100 | 550 | 6 | absent (cemented carbide) | 26 |
| | | | 4 | 8 | — | 14 | 70 | 3500 | 50 | absent (cemented carbide) | 26 |
| | | | 5 | 3 | — | — | 60 | 1300 | 22 | absent (cemented carbide) | 28 |
| | | | 6 | 7 | 5 | — | 40 | 5300 | 133 | absent (cemented carbide) | 28 |
| | | | 7 | 5 | — | — | 10 | 2100 | 210 | absent (cemented carbide) | 29 |
| | | | 8 | 10 | — | — | 60 | 6300 | 105 | absent (cemented carbide) | 28 |
| | | | 9 | 2 | — | — | 90 | 900 | 10 | absent (cemented carbide) | 27 |
| | | | 10 | 7 | — | — | 60 | 2300 | 38 | absent (cemented carbide) | 27 |

*Energy dispersive X-ray spectrometry was used for composition analysis of each alloy.
"—" marks in Table indicate that the values are lower than detection limits.

TABLE 6

| Type | | Type of cutting tool body made of WC-based cemented carbide | Type of cBN sintered material | Type of brazing material for bonding | Bonding part | | | | | | | | | |
|---|---|---|---|---|---|---|---|---|---|---|---|---|---|---|
| | | | | | Component composition of the interface layer (at %)* | | | | | | | Component composition of the crystal structure in the needle shape (at %)* | | |
| | | | | | Ave. layer thickness (μm) | Ti | Zr | N | B | Ni | Cu | Ti | Zr | N |
| Hard sintered material cutting tool of Comparative Example of the present invention | 1 | A-1 | B-1 | C-7 | 8.0 | 60 | 7 | 33 | — | — | — | 52 | 15 | 27 |
| | 2 | A-1 | B-2 | C-8 | 0.3 | 55 | 14 | 21 | — | 2 | 8 | No needle structure formation | | |
| | 3 | A-1 | B-3 | C-9 | No layer formation | | | | | | | 58 | 12 | 31 |
| | 4 | A-2 | B-4 | C-10 | 3.1 | 61 | — | 34 | 5 | — | — | 59 | 22 | 15 |
| | 5 | A-2 | B-5 | C-7 | 2.5 | 39 | 13 | 38 | — | — | — | 55 | 14 | 28 |
| | 6 | A-2 | B-6 | C-8 | 0.4 | 62 | 5 | 33 | — | — | — | 71 | 20 | — |
| | 7 | A-3 | B-1 | C-9 | 4.3 | 69 | 20 | 5 | — | 6 | — | 63 | 24 | 8 |
| | 8 | A-3 | B-2 | C-10 | 2.8 | 64 | — | 36 | — | — | — | 38 | 14 | 19 |
| | 9 | A-3 | B-3 | C-7 | 0.5 | 68 | 3 | 15 | — | 4 | 10 | 71 | 6 | 20 |
| | 10 | A-4 | B-4 | C-8 | 3.5 | 53 | 33 | 14 | — | — | — | 52 | 41 | — |
| | 11 | A-4 | B-5 | C-9 | 2.1 | 59 | 14 | 27 | — | — | — | 61 | 17 | 22 |
| | 12 | A-4 | B-6 | C-10 | 0.9 | 69 | — | 31 | — | — | — | 58 | 13 | 9 |

TABLE 6-continued

| | Type | B | Ni | Cu | Ave. width (nm) | Ave. length (nm) | Ave. aspect ratio | Presence or absence of falling off of the cutting edge part (broken part or the like) | High-temperature shearing strength (kgf/mm$^2$) |
|---|---|---|---|---|---|---|---|---|---|
| Hard sintered material cutting tool of Comparative Example of the present invention | 1 | 6 | — | — | 100 | 5000 | 50 | present (bonding part) | 25 |
| | 2 | \multicolumn{6}{c}{No needle structure formation} | | present (bonding part) | 18 |
| | 3 | 9 | — | — | 90 | 300 | 3 | present (bonding part) | 17 |
| | 4 | 4 | — | — | 120 | 7500 | 63 | present (bonding part) | 23 |
| | 5 | 3 | — | — | 40 | 500 | 13 | present (bonding part) | 20 |
| | 6 | 9 | — | — | 5 | 200 | 40 | present (bonding part) | 19 |
| | 7 | 5 | — | — | 100 | 5000 | 50 | present (bonding part) | 24 |
| | 8 | 9 | 10 | 10 | 50 | 4000 | 80 | present (bonding part) | 22 |
| | 9 | 3 | — | — | 90 | 600 | 7 | present (bonding part) | 24 |
| | 10 | 7 | — | — | 80 | 4500 | 56 | present (bonding part) | 23 |
| | 11 | — | — | — | 90 | 3300 | 37 | present (bonding part) | 18 |
| | 12 | 20 | — | — | 30 | 1500 | 50 | present (bonding part) | 22 |

*Energy dispersive X-ray spectrometry was used for composition analysis of each alloy.
"—" marks in Table indicate that the values are lower than detection limits.

According to the results shown in Tables 5 and 6, it is clear that falling off of the cutting edge part did not occur; adhesiveness between the cutting edge part and the cutting tool body made of WC-based cemented carbide was improved; and excellent cutting performance was obtained for a long time in the hard sintered material cutting tools of Examples 1-10 of the present invention, because: they had the bonding parts bonding the cutting edge part made of cBN sintered bodies and the cutting tool bodies made of WC-based cemented carbide through the brazing materials for bonding; and crystals having the needle structure were grown in such a way that the crystals contacted the cBN grains existing on the interface between the cBN sintered materials and the bonding parts.

In addition, it clear that the cutting edge parts fell off and reached to the end of the service life of the cutting tools quickly in the hard sintered material cutting tools of Comparative Examples, which did not have the needle structure as the hard sintered material cutting tools of the present invention.

In the descriptions of Examples of the present invention, the case using the insert was explained specifically. However, the present invention is not particularly limited to the description, and needless to say, the composite part can be applied to any cutting tool such as drills, end mills, and the like having the bonding part between the cutting edge part and the cutting tool body.

INDUSTRIAL APPLICABILITY

The cutting tool of the present invention can be used for high load cutting on a variety of steel; casted iron; Al—SiC composite material; or the like. In addition, the cutting tool of the present invention has excellent bonding strength between the cutting edge part made of cBN sintered material and the cutting tool body made of WC-based cemented carbide. By having these characteristics, the cutting tool of the present invention exhibits a stable cutting performance for a long time. Because of the reasons described above, improvement of the cutting equipment's performance; labor and energy saving in cutting work; and cost saving are fully and satisfyingly addressed.

REFERENCE SIGNS LIST

1: cBN sintered material
2: Boding part

3: Cutting tool body
4: Bonding surface of the cBN sintered material
5: Bonding surface of the cutting tool body
6: cBN sintered material
7: Bonding part
8: Interface layer (including Ti and N)
9: cBN crystal grain
10: Needle crystal structure (including Ti, Zr, and B)

What is claimed is:

1. A composite part comprising:
a cemented carbide body; and
a cubic boron nitride sintered material bonded to the cemented carbide body through a bonding part, wherein
(a) the bonding part includes an interface layer having an average layer thickness of 0.5 μm to 5 μm, said interface layer being adjacent to the cubic boron nitride sintered material and containing 50 atomic % or more of Ti and 10 atomic % or more of N,
(b) the bonding part has needle crystal structure, which: contacts a cubic boron nitride grain constituting the cubic boron nitride sintered material; contains 50 atomic % or more of Ti, 10-30 atomic % of Zr, and 2-10 atomic % of B; and has 10-100 nm of an average width and 5 or more of an average aspect ratio, and
(c) the needle crystal structure has a length equal to or longer than a layer thickness of the interface layer, which is adjacent to the cubic boron nitride sintered material and contains at least Ti and N, and traverses the interface layer in a thickness direction.

2. A cutting tool with a cubic boron nitride sintered material comprising the composite part according to claim 1, wherein the bonding part interposes between the cubic boron nitride material and a cutting tool body made of cemented carbide.

3. The composite part according to claim 1, wherein
the bonding part further comprises a brazing material portion, which contains 35-40% of Ti in a mass ratio; 35-40% of Zr in a mass ratio; 5-15% of Ni in a mass ratio; and the Cu balance including inevitable impurities, and
the interface layer is formed between the cubic boron nitride sintered material and the brazing material portion.

* * * * *